No. 661,188. Patented Nov. 6, 1900.
A. NETTL.
PROCESS OF SEPARATING METALS FROM THEIR COMBINATIONS.
(Application filed Dec. 29, 1897.)
(No Model.) 2 Sheets—Sheet 1.
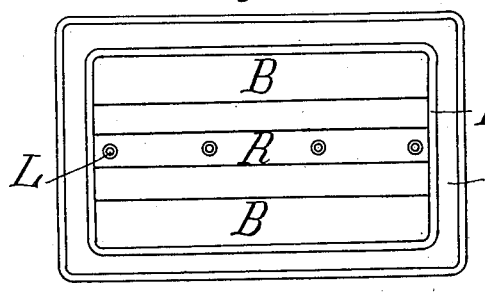
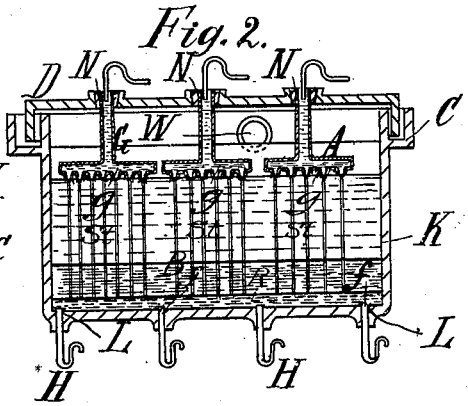
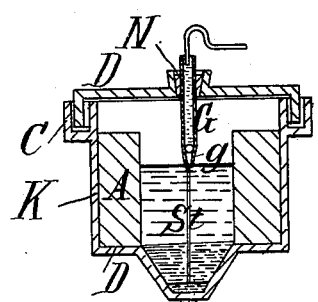
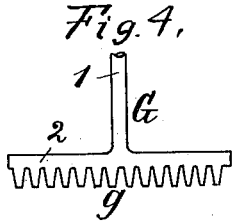
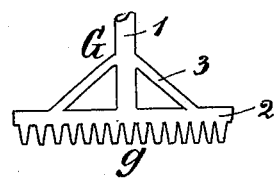
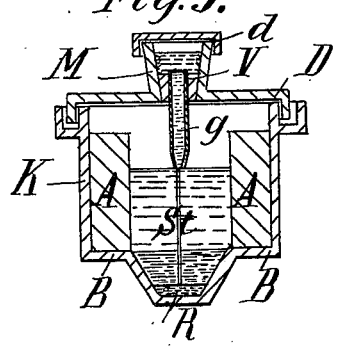
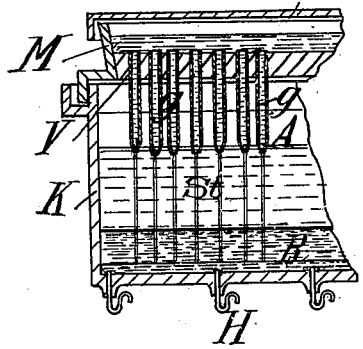
Witnesses.
Inventor:
Anton Nettl
By his Attorneys.

No. 661,188. Patented Nov. 6, 1900.
A. NETTL.
PROCESS OF SEPARATING METALS FROM THEIR COMBINATIONS.
(Application filed Dec. 29, 1897.)
(No Model.) 2 Sheets—Sheet 2.

Fig. 12.ª

Witnesses.
E. B. Bolton

Inventor:
Anton Nettl
By
his Attorneys

UNITED STATES PATENT OFFICE.

ANTON NETTL, OF PRAGUE, AUSTRIA-HUNGARY.

PROCESS OF SEPARATING METALS FROM THEIR COMBINATIONS.

SPECIFICATION forming part of Letters Patent No. 661,188, dated November 6, 1900.

Application filed December 29, 1897. Serial No. 664,245. (No specimens.)

*To all whom it may concern:*

Be it known that I, ANTON NETTL, a subject of the Emperor of Austria-Hungary, residing at 28 Mariengasse, Prague, Bohemia, Austria-Hungary, have invented a certain new and useful Process of Separating Metals from Their Combinations, of which the following is a full and clear specification.

This invention has been patented in England under date of July 8, 1896, No. 15,129.

The subject of the present invention is a process which can be generally employed for the electrolytic decomposition of conducting bodies which are separable by an electric current.

Several forms of the apparatus for carrying out the improved process are illustrated in the accompanying drawings, which show the disposition of the main feature of the invention—namely, the mercury electrode falling quite freely without any substratum—which can be employed in a variety of ways.

Similar letters and figures of reference indicate corresponding parts.

Figure 11:
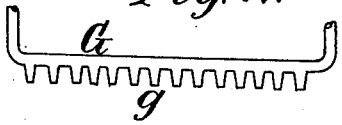
Figure 12:
Figure 13:
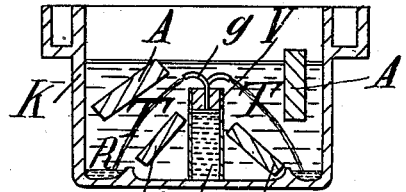
Figure 14:
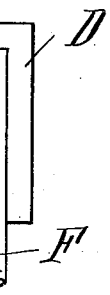

Figure 1 of the drawings shows a plan with the cover removed. Fig. 2 is a longitudinal vertical section of the same. Fig. 3 is a transverse section. Figs. 4 and 4$^a$ are details of the glass tubes. Figs. 5 and 6 are respectively a transverse and a part longitudinal section of a modification. Figs. 7, 8, 9, and 10 are part transverse sectional views of further modifications. Fig. 11 is a modified form of tube. Figs. 12 and 12$^a$ are details illustrating a modification of outlet siphon-pipes. Fig. 13 is a transverse sectional view of a further modification, and Fig. 14 is a detail showing a manner of supplying quicksilver.

The apparatus shown in Figs. 1, 2, and 3 in plan, with the cover removed, and two sectional elevations, respectively, consists of a vessel K, of suitable material, as porcelain, stoneware, cement, or wood. On its upper edge it is provided with a channel C, which is filled with water for the purpose of effecting a tight closing of the vessel. The bottom is shaped as shown in Fig. 3—that is to say, it is provided with a groove R, in which are fitted siphon-pipes H, preferably of iron. The cover D is also provided with openings N, which are arranged directly above the groove R between two of the siphon-pipes. In these openings are fitted glass or porcelain tubes G, which consist, as may be seen from Fig. 4, of a short vertical tube 1, to which is connected a horizontal tube 2, provided with a number of small tubes $g$, with fine end openings. The tubes G are arranged in such a way that the horizontal tubes are parallel with the groove R. The vessel is provided with an opening W to carry off the evolved gases. Supposing the apparatus to be used for decomposing common salt, the positive electrodes, which consist of charcoal or any other material suitable for the purpose, are placed on the banks B, and then the vessel is filled with the electrolyte. To prevent the latter from escaping through the siphon-pipes H, these are filled previously with quicksilver. The negative electrode consists of quicksilver, which is introduced into the tubes G, from where it flows or falls down through the openings $g$ in vertical jets through the electrolyte to the groove R, thus forming a continuous negative electrode, which when the circuit is closed will take off the sodium, while the chlorin gas escapes through the opening W. The quicksilver accumulates in the groove R and flows through the siphon-pipes H into suitable vessels, where by means of water or steam the sodium is given off again in the form of caustic soda. The quicksilver is then raised by a pump or any other lifting apparatus to enter again the supply-tube. The quicksilver found at the bottom of the cell, which cannot flow off quickly enough, is suitably protected from the influence of the electrolyte by a cover of a relatively heavy fluid—that is, any fluid such as chloroform or sulfid of carbon—which being heavier than the electrolyte, consisting in the case above given of concentrated chlorid of sodium, will resist the action of chlorin and caustic soda or of sodium amalgam.

Figure 7:
Figure 8:
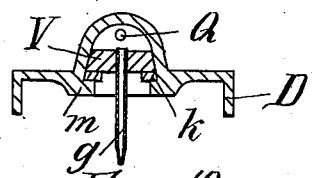
Figure 9:
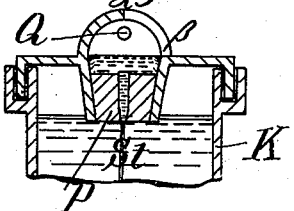
Figure 10:
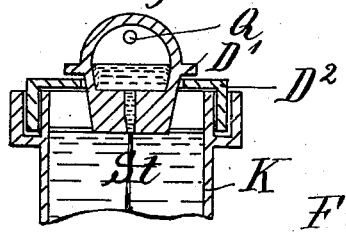

In Figs. 5 to 10 are shown several modifications of the apparatus respecting to the cover of the vessel and the supply of quicksilver thereto. The cover D (shown in Figs. 5 and 6) is provided with a channel M, the bottom of which is formed by a list V, of wood, cork, ebonite, or any other suitable material, provided with openings, into which are fitted either the tubes G (shown in Fig. 4) or small tubes $g$, as shown in Figs. 5 and 6. The channel is continually supplied with quicksilver and may be closed by a cover $d$. In Figs. 7 to 10 are represented other forms of the channel, the quicksilver being supplied by the opening Q. In Fig. 7 the glass tube $g$ is fused into a glass stopper, and the latter is understood as ground or fitted into the earthen cover or lid. The admission of the jets into the apparatus takes place then through many such stoppers. Instead of the openings in the list fitted with tubes a single tube G, Fig. 11, may be used, which is provided with a number of short additional pipes $g$.

A modification of the under siphon-pipes is shown in Fig. 12, where the flowing off of the quicksilver is performed by a vertical tube E, passing through the bottom of the vessel and provided on its upper end with a bell S and several openings O under the latter, thus preventing any flowing out of the electrolyte through this pipe. Instead of the bell there can also be employed a small curved pipe $e$, fitted in the upper end of the tube E.

Fig. 13 shows an apparatus where the quicksilver enters the vessel from beneath through the inlet $g$ and passes through the electrolyte in a jet T of parabolic form. The receiver Q is supplied from a reservoir placed somewhat above the level of the vessel K. The positive electrodes A are preferably arranged in such a way that one of them is placed beneath and the other above the quicksilver jet. The form of the quicksilver jets can be of different kinds, according to the shape of the inlet-openings.

It will be understood that, if desired, several cells of the kind before described could be arranged adjacent to and parallel with each other and supplied with mercury by common supply-pipes F, as indicated diagrammatically in Fig. 14.

It is understood as a matter of course that the arrangements described will be multiplied within one cell in apparatus intended for practical services, so that in one common cell a larger number of anodes and series of mercury-jets will be arranged beside each other or one above the other. In executions according to Fig. 1 the cover might have mercury-feed tubes in common, made also of one piece with the cover.

What I claim as my invention, and desire to secure by Letters Patent, is—

The herein-described process of electrode-composition which consists in causing a mercury electrode to continually fall freely by gravity in a plurality of finely-divided streams through the body of the electrolyte, and passing an electric current to the mercury as cathode through an electrolyte containing a metal capable of combining with such mercury cathode.

Signed at Prague, Austria-Hungary, this 13th day of December, 1897.

ANTON NETTL.

Witnesses:
ADOLPH FISCHER,
HUGO DONZELMANN.